(12) United States Patent
Roberts

(10) Patent No.: US 9,027,057 B2
(45) Date of Patent: *May 5, 2015

(54) SYSTEM AND METHOD FOR CREATING AND MANAGING CUSTOM MEDIA CHANNELS

(71) Applicant: Qurio Holdings, Inc., Raleigh, NC (US)

(72) Inventor: Thomas A. Roberts, Fuquay-Varina, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,602

(22) Filed: Nov. 11, 2013

(65) Prior Publication Data

US 2014/0075481 A1   Mar. 13, 2014

Related U.S. Application Data

(63) Continuation of application No. 13/052,447, filed on Mar. 21, 2011, now Pat. No. 8,584,169, which is a continuation of application No. 11/388,902, filed on Mar. 24, 2006, now Pat. No. 7,913,280.

(51) Int. Cl.
  *G06F 3/00* (2006.01)
  *G06F 13/00* (2006.01)
  *H04N 5/445* (2011.01)
  *H04N 21/45* (2011.01)
  *H04N 21/462* (2011.01)
  *H04N 21/475* (2011.01)

(52) U.S. Cl.
  CPC ....... *H04N 21/4532* (2013.01); *H04N 21/4622* (2013.01); *H04N 21/4755* (2013.01)

(58) Field of Classification Search
  USPC .......................... 725/39, 46–47, 51, 109–110
  See application file for complete search history.

(56) References Cited

U.S. PATENT DOCUMENTS

| | | | |
|---|---|---|---|
| 5,109,482 A | 4/1992 | Bohrman | |
| 6,216,141 B1 * | 4/2001 | Straub et al. | 715/234 |
| 6,389,467 B1 | 5/2002 | Eyal | |
| 6,484,199 B2 * | 11/2002 | Eyal | 709/223 |
| 7,228,305 B1 | 6/2007 | Eyal et al. | |

(Continued)

FOREIGN PATENT DOCUMENTS

WO   0040021 A1   7/2000

OTHER PUBLICATIONS

Author Unknown, "Blinkx TV White Paper," Blinx, Copyright: 2007, 10 pages.

(Continued)

*Primary Examiner* — Mulugeta Mengesha
(74) *Attorney, Agent, or Firm* — Withrow & Terranova, PLLC

(57) ABSTRACT

A system and method for creating and managing custom media channels within an Interactive Digital Program Guide (IDPG) of a device having a set-top box function associated with a cable or satellite television network. In general, a user interacts with the set-top box function to define a custom media channel. The custom media channel may be defined by a channel name and user preferences. Once the custom media channel is defined, an Internet search is performed based on the user preferences in order to identify media presentations for the custom media channel. Thereafter, when a user selects the custom media channel via the IDPG, the media presentations are played in a substantially continuous stream in either a predetermined or random sequence.

18 Claims, 6 Drawing Sheets

(56) References Cited

U.S. PATENT DOCUMENTS

| | | | |
|---|---|---|---|
| 7,281,220 B1* | 10/2007 | Rashkovskiy | 715/838 |
| 7,320,025 B1 | 1/2008 | Steinberg et al. | |
| 7,372,991 B2 | 5/2008 | Chen et al. | |
| 7,913,280 B1 | 3/2011 | Roberts | |
| 8,584,169 B1 | 11/2013 | Roberts | |
| 2001/0003828 A1 | 6/2001 | Peterson et al. | |
| 2001/0049826 A1 | 12/2001 | Wilf | |
| 2002/0029384 A1* | 3/2002 | Griggs | 725/46 |
| 2002/0032019 A1 | 3/2002 | Marks et al. | |
| 2002/0078467 A1 | 6/2002 | Rosin et al. | |
| 2002/0083460 A1 | 6/2002 | Hejna, Jr. | |
| 2002/0088004 A1 | 7/2002 | Kitsukawa et al. | |
| 2002/0104099 A1 | 8/2002 | Novak | |
| 2002/0124071 A1 | 9/2002 | Proehl et al. | |
| 2002/0129367 A1 | 9/2002 | Devara | |
| 2002/0129376 A1 | 9/2002 | Kitsukawa et al. | |
| 2002/0144279 A1 | 10/2002 | Zhou | |
| 2002/0157098 A1 | 10/2002 | Zustak et al. | |
| 2002/0157100 A1 | 10/2002 | Kitsukawa et al. | |
| 2002/0157107 A1 | 10/2002 | Kitsukawa et al. | |
| 2002/0157109 A1 | 10/2002 | Nakano et al. | |
| 2003/0101230 A1 | 5/2003 | Benschoter et al. | |
| 2004/0117824 A1 | 6/2004 | Karaoguz et al. | |
| 2005/0108754 A1 | 5/2005 | Carhart et al. | |
| 2005/0245243 A1 | 11/2005 | Zuniga | |
| 2006/0004689 A1 | 1/2006 | Chandrasekaran et al. | |
| 2006/0143664 A1 | 6/2006 | Hartselle et al. | |
| 2006/0277316 A1 | 12/2006 | Wang et al. | |
| 2007/0074245 A1 | 3/2007 | Nyako et al. | |
| 2007/0156589 A1 | 7/2007 | Zimler et al. | |
| 2008/0092168 A1 | 4/2008 | Logan et al. | |

OTHER PUBLICATIONS

Author Unknown, "ShadowTV Monitoring: Broadcast Monitoring System," ShadowTV, Copyright: 2003, 2 pages.

Author Unknown, "ShadowTV Webcasting: Broadcast to Webcast Service," ShadowTV, Copyright: 2000, 2 pages.

Notice of Allowance for U.S. Appl. No. 11/388,902, mailed Nov. 12, 2010, 10 pages.

Non-Final Office Action for U.S. Appl. No. 11/388,902, mailed May 27, 2009, 19 pages.

Non-Final Office Action for U.S. Appl. No. 11/388,902, mailed Dec. 1, 2009, 16 pages.

Final Office Action for U.S. Appl. No. 11/388,902, mailed Apr. 27, 2010, 20 pages.

Non-Final Office Action for U.S. Appl. No. 13/052,447, mailed Mar. 19, 2013, 12 pages.

Notice of Allowance for U.S. Appl. No. 13/052,447, mailed Jul. 10, 2013, 10 pages.

* cited by examiner

| CUSTOM MEDIA CHANNELS | | | | | | | |
|---|---|---|---|---|---|---|---|
| EDIT | SKATEBOARDING | VIDEO 1 | VIDEO 2 | VIDEO 3 | VIDEO 4 | VIDEO 5 | VIDEO 6 |
| EDIT | COOKING | VIDEO 1 | VIDEO 2 | VIDEO 3 | VIDEO 4 | VIDEO 5 | VIDEO 6 |
| EDIT | GUITAR | VIDEO 1 | VIDEO 2 | VIDEO 3 | VIDEO 4 | VIDEO 5 | VIDEO 6 |
| EDIT | UNUSED | | | | | | |
| EDIT | UNUSED | | | | | | |
| EDIT | UNUSED | | | | | | |

*FIG. 2*

SYSTEM AND METHOD FOR CREATING AND MANAGING CUSTOM MEDIA CHANNELS

RELATED APPLICATIONS

The present application is a continuation of co-pending U.S. patent application Ser. No. 13/052,447, filed Mar. 21, 2011, entitled "SYSTEM AND METHOD FOR CREATING AND MANAGING CUSTOM MEDIA CHANNELS," which claims priority to and is a continuation of U.S. patent application Ser. No. 11/388,902, filed Mar. 24, 2006, entitled "SYSTEM AND METHOD FOR CREATING AND MANAGING CUSTOM MEDIA CHANNELS," now U.S. Pat. No. 7,913,280 B1, each of which is hereby incorporated herein by reference in its entirety.

TECHNICAL FIELD

The present invention relates to a set-top box for a cable or satellite television network and more specifically relates to a set-top box function for creating and managing custom media channels.

BACKGROUND

There is currently a vast amount of media content such as videos and audio files available via the Internet. However, the current methods for identifying and viewing media content of interest are cumbersome. For example, many video storage sites store and provide access to videos. However, a viewer must navigate through the video storage site to select videos to view. In addition, only a single video clip can be viewed at a time. There are also a number of search engines providing the ability to search for videos based on keywords used to tag the videos where the results of the search are aggregated into one or more web pages. However, the user must manually select the videos to view, and the videos can only be viewed one at a time. Similar issues arise when attempting to locate audio files of interest on the Internet. Thus, there remains a need for a system and method for identifying and presenting media content of interest to a user.

SUMMARY

The present invention provides a system and method for creating and managing custom media channels within an Interactive Digital Program Guide (IDPG) of a media device having a set-top box function associated with a television content provider. The custom media channels are preferably formed using video content but may optionally include both video and audio content. The media device may be a set-top box associated with a cable or satellite television service, a personal computer including the set-top box function, or the like. The set-top box function may be a media card or software component installed in the media device.

In general, a user interacts with the set-top box function to define a custom media channel. The custom media channel may be defined by a channel name and user preferences. The user preferences may include, but are not limited to, one or more keywords describing desired media, one or more preferred Internet domains, information providing access to one or more subscription websites, a maximum file size, a maximum running time, a minimum running time, and the like. Once the custom media channel is defined, an Internet search is performed based on the user preferences in order to identify media presentations for the custom media channel. Thereafter, when a user selects the custom media channel via the IDPG, the media presentations are played in a substantially continuous stream in either a predetermined or random sequence. When the custom media channel contents are exhausted, the channel loops and plays again, thereby creating a custom media channel devoted to media matching the user preferences.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 2 illustrates an exemplary user interface of the IDPG enabling a user to create, edit, or view a custom media channel according to one embodiment of the present invention;

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for creating and managing custom media channels within an Interactive Digital Program Guide (IDPG) of a media device having a set-top box function associated with a television network. The custom media channels are preferably formed using video content. However, the custom media channels may optionally include both video and audio content. Thus, although the discussion below focuses on video content, it is to be understood that the custom media channels of the present invention may include both video and audio content.

Figure 1:
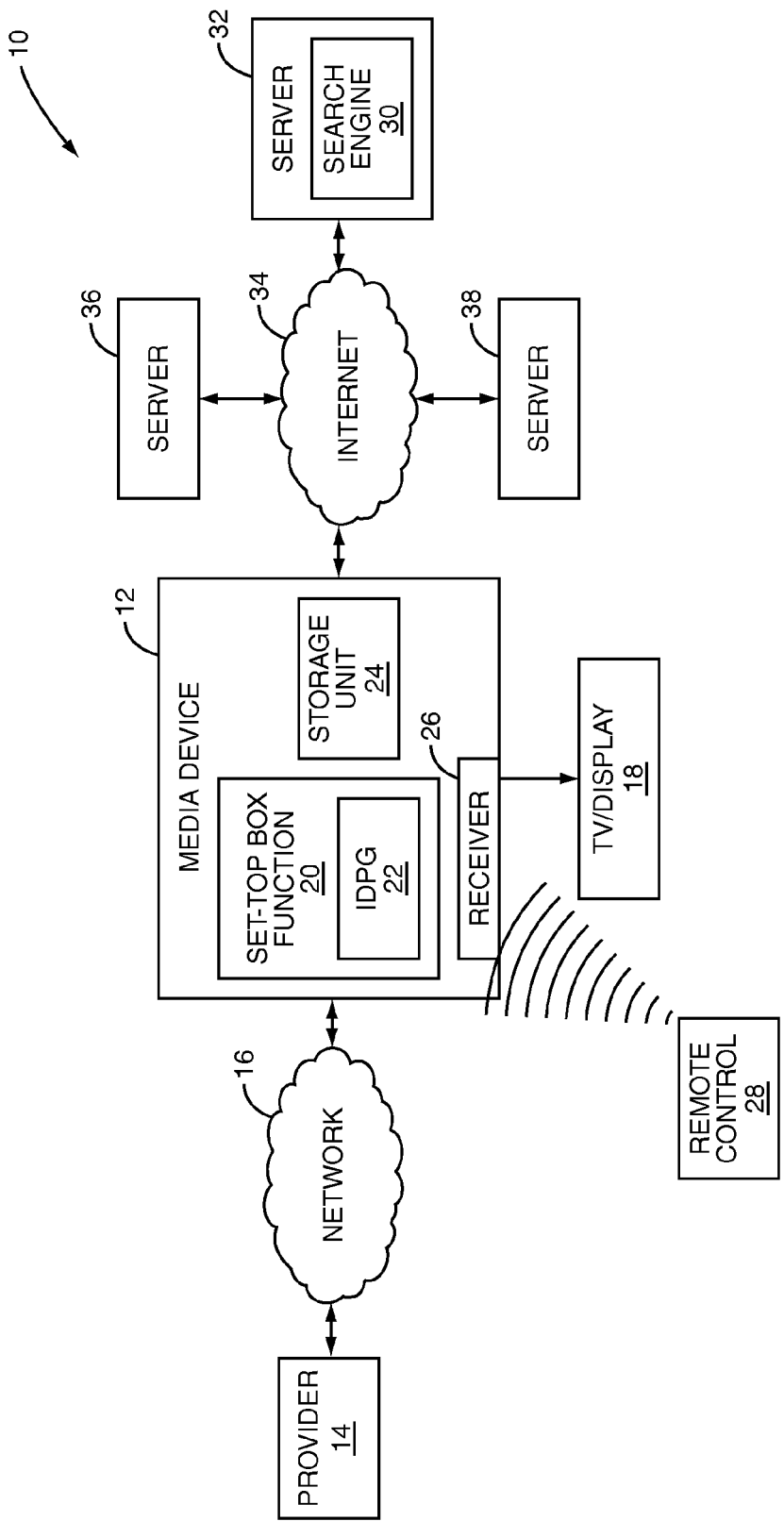
FIG. 1 illustrates an exemplary system for creating and maintaining custom media channels within an Interactive Digital Programming Guide (IDPG) according to one embodiment of the present invention.

FIG. 1 illustrates an exemplary system 10 for generating and maintaining custom media channels according to one embodiment of the present invention. In general, the system 10 includes a media device 12 associated with a television service provider 14. The media device 12 receives television content from the provider 14 via a network 16 and provides the television content to a television, or display, 18 for presentation to a user. Preferably, the television service provider 14 is a traditional land-based or satellite-based television service provider. Alternatively, the television service provider 14 may be an Internet-based provider that provides streaming television content in a manner similar to that of traditional land-based or satellite-based television service providers. The network 16 may be a land-based network, a satellite-based network, a network providing open-air communication, the Internet, or the like.

The media device 12 may be a set-top box such as, but not limited to, a digital television receiver or a satellite television receiver, either of which may provide Digital Video Recorder (DVR) or Personal Video Recorder (PVR) functionality. Alternatively, the media device 12 may be a personal computer or the like. The media device 12 includes a set-top box function 20, an IDPG 22, a storage unit 24, and a receiver 26 for communicating with a user via a remote control unit 28. The set-top box function 20 may be implemented in hardware, software, or a combination of hardware and software. For example, the set-top box function 20 may be a media card including hardware and software components. In an alternative embodiment, the set-top box function 20 may be implemented in the television or display 18.

The IDPG 22, receiver 26, and remote control unit 28 form a user interface enabling a user to select a desired television channel to be displayed on the television 18 and, according to the present invention, create, manage, and view one or more custom media channels. The storage unit 24 may be any type of digital storage unit such as, but not limited to, a hard-disc drive, Random Access Memory (RAM), or the like. The storage unit 24 operates to store information defining one or more custom media channels and a number of media presentations for the custom media channels. As stated above, the media presentations are preferably video files but may optionally include both video and audio files. However, the discussion herein focuses on videos. Further, the videos may be any type of video content accessible via the Internet 34 such as video clips, television programming, movies, or the like.

According to the present invention, a user may interact with the set-top box function 20, preferably via the IDPG 22, to define a number of custom media channels. A custom media channel may be defined by a channel name and user preferences. The user preferences may include, but are not limited to, one or more keywords to be used to search for desired videos, one or more preferred Internet domains to be searched, information providing access to one or more subscription websites to be searched, a maximum file size, a maximum running time, a minimum running time, a preferred order in which the videos for the custom media channel are to be displayed, a preferred retention period to keep videos in the custom media channel, and the like.

Once the custom media channel is defined, the set-top box function 20 interacts with a search engine 30 located on a remote server 32 via the Internet 34 to initiate an Internet search for videos satisfying at least a portion of the user preferences in order to identify videos for the custom media channel. It should be noted that while the Internet 34 is the preferred embodiment, the present invention is not limited thereto. The same principals apply to any network providing access to a large number of searchable videos. The search engine 30 may be, for example, the Yahoo!® video search engine or the Google® video search engine. In response, the search engine 30 provides information identifying a number of videos hosted by, for example, servers 36 and 38 coupled to the Internet 34. As an example, the search engine 30 may provide information identifying a number of videos tagged with one or more of the keywords defined in the user preferences. If one or more preferred Internet domains or subscription sites are defined in the user preferences, the search engine 30 may only search the preferred Internet domains or subscription sites for videos tagged with one or more of the keywords defined in the user preferences. The set-top box function 20 may then process the information from the search engine 30 to identify videos satisfying the remaining user preferences such as maximum file size, maximum running time, minimum running time, and the like, thereby identifying videos for the custom media channel. Alternatively, the search engine 30 may identify the videos satisfying all of the user preferences.

Once videos for the custom media channel are identified, the videos or references to the videos are stored in the storage unit 24 associated with the set-top box function 20. More specifically, if the videos, or any subset of the videos, are downloadable video files such as, but not limited to, Moving Pictures Expert Group (MPEG) video files, then the videos are downloaded to the media device 12 and stored in the storage unit 24 in association with the custom media channel. However, if the videos, or a subset of the videos, are steaming content, Uniform Resource Locators (URLs) for the streaming videos, rather than the actual video files, are stored in the storage unit 24 in association with the custom media channel. Preferably, a new Internet search is performed periodically in order to identify new videos satisfying the user preferences.

After the custom media channel is defined and videos for the custom media channel are identified, a user may interact with the IDPG 22 to select the custom media channel for viewing. In response, the set-top box function 20 provides the videos for the custom media channel to the television 18 in a substantially continuous stream in either a predetermined or random sequence. When all of the videos for custom media channel have played, the channel loops and plays again, thereby creating a custom media channel devoted to videos matching the user preferences.

In one embodiment, advertisements may be inserted between the videos in the custom video channel. The advertisements may be inserted after each video, after a predetermined number of videos, or periodically based on a predetermined amount of time between advertisements. In addition or alternatively, advertisements may be overlaid on one or more videos in the custom media channel or shown on a portion of the television or display 18 concurrently with the videos in the custom media channel. The advertisements may be pre-selected by the provider 14 or an Internet service provider associated with the set-top box function 20. Alternatively, the advertisements may be obtained from the provider 14 or server, such as one of the servers 36 or 38, based on the keywords defined by the user for the custom media channel. In addition to keywords, other user preferences such as a preferred genre and demographic information such as the age, sex, and the like regarding the user may be used to select advertisements.

FIG. 2 illustrates an exemplary user interface 40 of the IDPG 22 enabling a user to define a custom media channel. While only custom media channels are shown in the user interface 40, the user interface 40 may display both traditional television channels and the custom media channels of the present invention. As illustrated, three custom media channels have been created. More specifically, a "skateboarding" custom media channel, a "cooking" custom media channel, and a "guitar" custom media channel have been created. The data defining these channels may be edited by selecting the edit button located to the left of the channel name. The custom media channels may be edited to change the name of the custom media channel, the keywords to be used to search for desired videos, the preferred Internet domains to be searched, the information providing access to one or more subscription websites to be searched, the maximum video file size, the maximum video running time, the minimum video running time, the preferred order in which the videos for the custom media channel are to be displayed, the preferred retention period to keep videos in the custom media channel, and the like.

To the right of the names of the custom media channels, titles of the videos, or titles of a portion of the videos, in the custom media channels are displayed. A user may select the title of a desired custom media channel to begin playing the media channel. Alternatively, the user may select the title of a desired video in the custom media channel to begin playing the custom media channel at the selected video or to play only the selected video. While viewing a custom media channel, the set-top box function 20 (FIG. 1) may enable the user to pause, rewind, fast-forward, or stop playback. In addition, the set-top box function 20 may enable a user to skip to the previous or next video in the custom media channel in a manner similar to skipping from one chapter to another during playback of a Digital Video Disc (DVD). When a user stops playback, the current watch point defining the current point in playback may be stored such that playback may begin at the watch point the next time the user begins playback of the custom media channel. Alternatively, the user may choose to begin playback at the beginning of the custom media channel.

In this example, the user may define a new custom media channel by selecting the "edit" button to the left of one of the "unused" custom media channels. As discussed below, when the "edit" button is selected, a new user interface appears. The new user interface enables the user to enter the channel name and user preferences defining the new custom media channel. Once the channel is defined, an Internet search is performed in order to populate the custom media channel with a number of videos satisfying the user preferences defined by the user.

Figure 3:
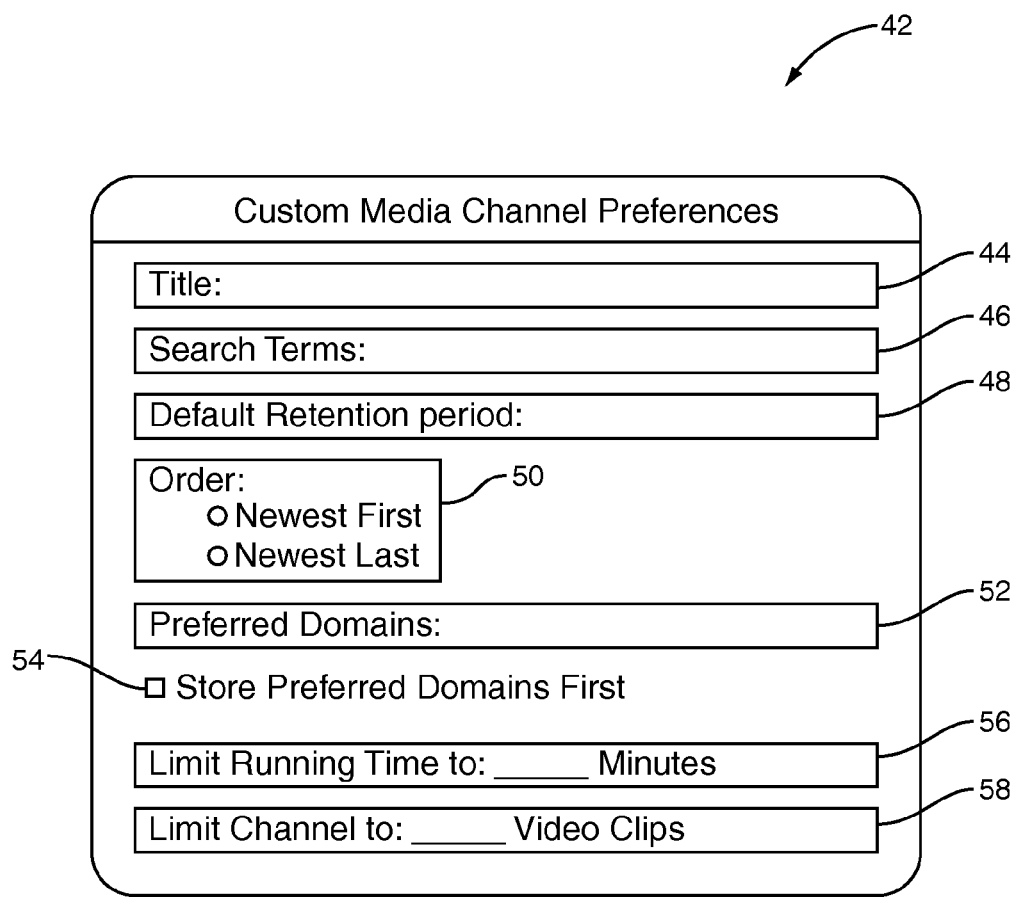
FIG. 3 illustrates an exemplary user interface for defining a custom media channel according to one embodiment of the present invention.

FIG. 3 illustrates an exemplary user interface 42 of the IDPG 22 enabling a user to create a new custom media channel or edit an existing media channel. As illustrated, the user interface 42 includes a title field 44, a search terms field 46, a default retention period field 48, an order field 50, a preferred domains field 52, a check box 54, a running time limit field 56, and a number limit field 58. Note that the illustrated user interface 42 is exemplary. The user interface 42 may include additional or alternative fields for obtaining additional or alternative user preferences to be used to identify videos for the custom media channel. For example, the user interface 42 may additionally include one or more fields enabling a user to enter information providing access to one or more subscription websites to be searched.

The title field 44 enables the user to enter a title for the custom media channel. The search terms field 46 enables the user to enter one or more keywords to be used to search for videos for the custom media channel. The keywords may be a list of keywords or a query containing both keywords and Boolean operators. The default retention period field 48 enables the user to enter a default retention period for the videos in the custom media channel. The retention period for each individual video may be changed by the user from the default retention period to a desired retention period once the custom media channel is populated. Once a video has exceeded its retention period, it is removed from the custom media channel, and the title or other information identifying the video may be archived such that the video is not added back to the custom media channel due to a subsequent Internet search for at least a predetermined period of time. Videos that are removed for exceeding their retention periods may optionally be stored in the media device 12 in a cache having a predetermined storage limit. The cache may be implemented in the storage unit 24 (FIG. 1). Once the cache is full, the videos in the cache may be permanently deleted in a First-In-First-Out (FIFO) fashion. Further, the user may select one or more videos in the cache and re-instate the videos into the custom media channel if desired.

The order field 50 enables the user to define the order in which the videos of the custom media channel are to be played. In this example, the order may be either "newest first," which is Last-In-First-Out (LIFO), or "newest last," which is FIFO. Although not illustrated, the user may alternatively choose to have the videos played in a random, or pseudo-random, order.

The preferred domains field 52 enables the user to define one or more preferred domains to be searched. The preferred domains may be defined by their URLs. The user may select the check box 54 if the user desires that the videos from the preferred domains be given priority such that they are shown first in the custom media channel. In this example, other domains may be searched for videos, but, if the check box 54 is selected, the videos from the preferred domains are given priority. Alternatively, only the preferred domains may be searched. The fields 56 and 58 enable the user to define a running time limit, or maximum running time, for the videos in the custom media channel and a maximum number of videos to be in the custom media channel.

Figure 4:
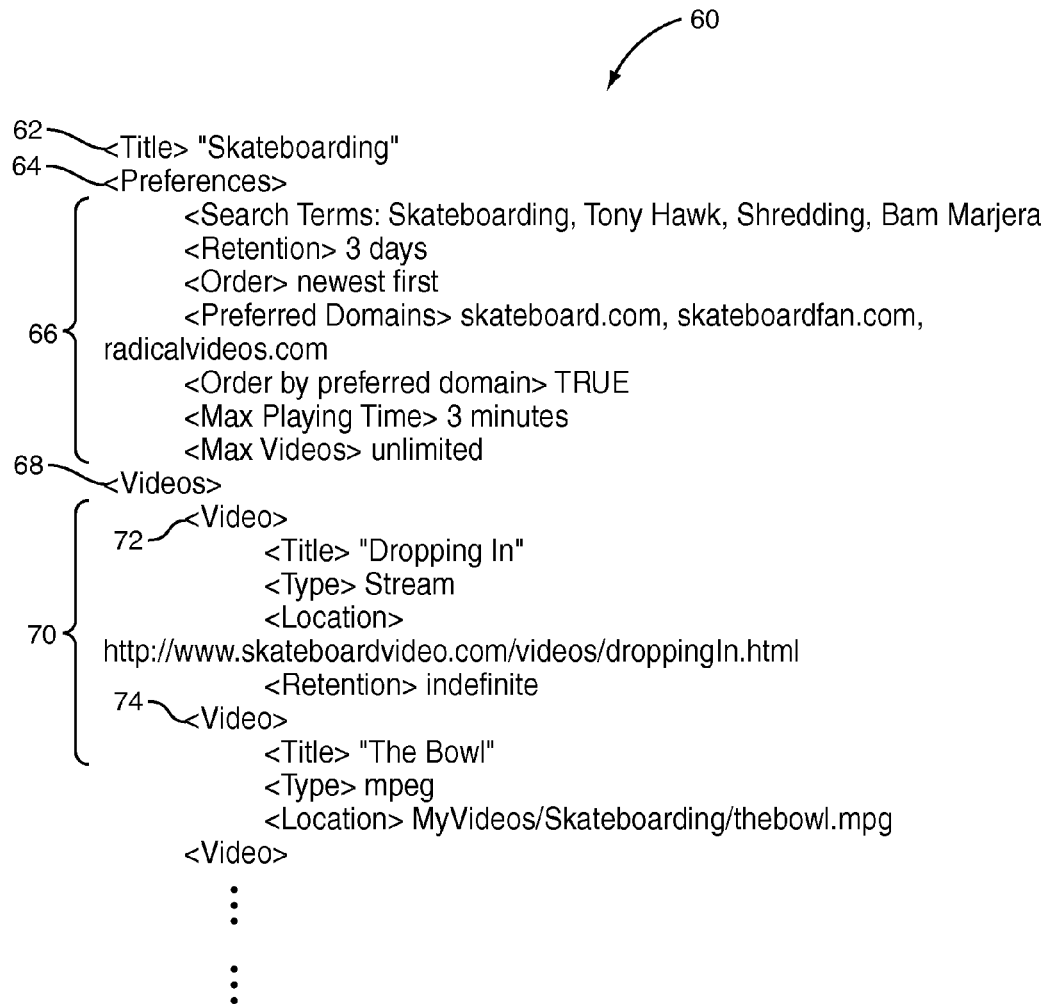
FIG. 4 illustrates an exemplary data structure for a custom media channel according to one embodiment of the present invention.

FIG. 4 illustrates an exemplary data structure 60 for a custom media channel. As illustrated, the data structure 60 includes a title field 62 and a user preferences field 64. Within the user preferences field 64, the data structure 60 includes user preferences 66 such as the keywords or search terms, the default retention period, the order in which the videos are to be played, the preferred domains, information indicating whether the user desires that the videos from the preferred domains are to be played first, the maximum playing time for the videos, and the maximum number of videos. The user preferences 66 in this example correspond to those defined in the exemplary user interface 42 of FIG. 3.

In addition, the data structure 60 includes a video field 68 including video data structures 70 defining the videos in the custom media channel. A first video data structure 72 includes information providing a title, type, location, and retention period for a first video in the custom media channel. As illustrated, the first video is a streaming video type. As such, rather than downloading and storing the first video in the storage unit 24 (FIG. 1), the URL of the video is stored as the location of the first video. When the first video is to be played, the set-top box function 20 retrieves the first video using the URL. A second video data structure 74 includes information providing a title, type, location, and retention period for a second video in the custom media channel. The second video is a Moving Pictures Experts Group (MPEG) video. As such, the second video is downloaded to the media device 12 and stored in the storage unit 24. In this example, the file path to the second video is "MyVideos/Skateboarding/the-bowl.mpg." When the second video is to be played, the set-top box function 20 retrieves the second video from the storage unit 24. In a similar fashion, the data structure 60 stores information identifying each video in the custom media channel.

Figure 5:
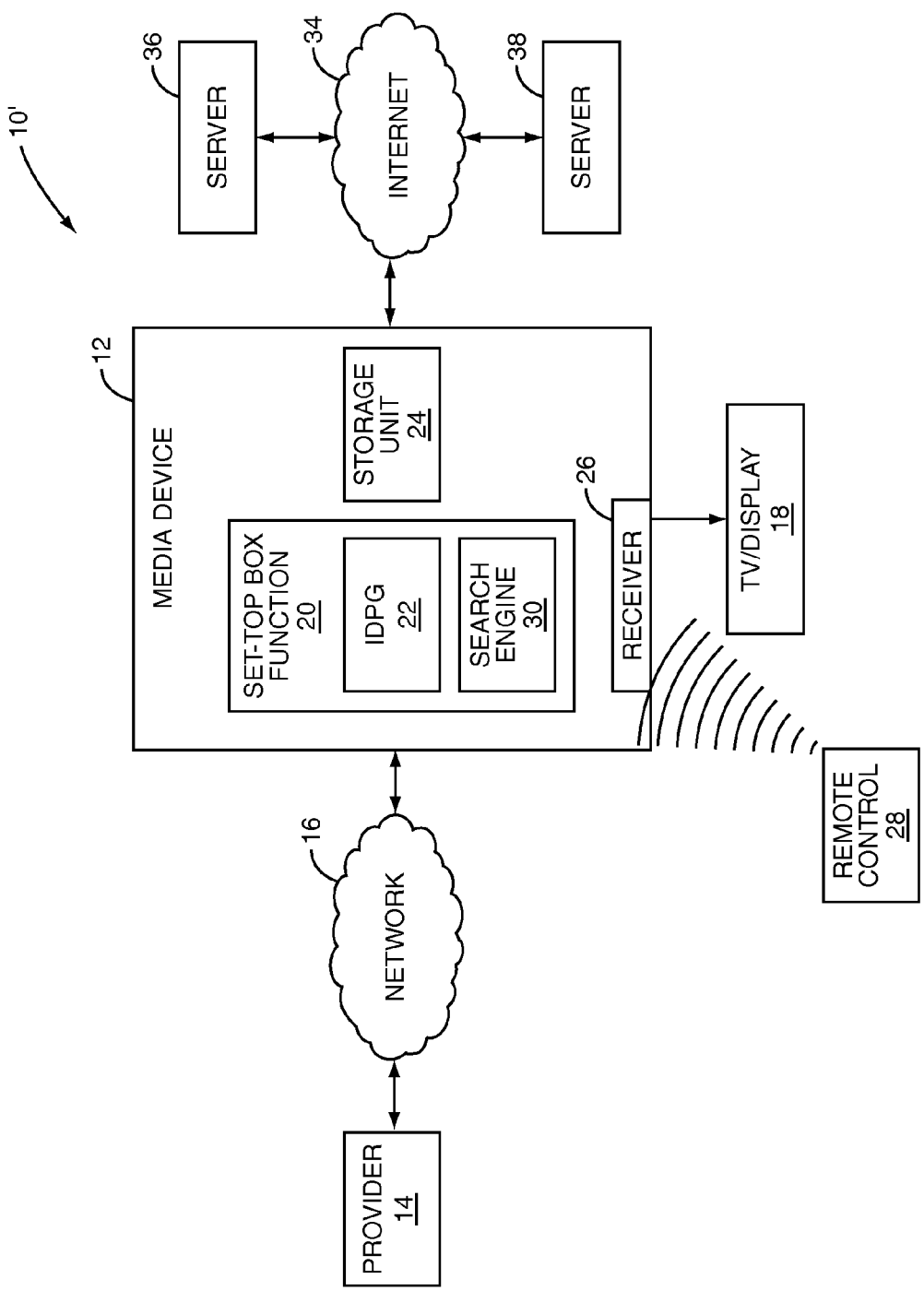
FIG. 5 illustrates an exemplary system for creating and maintaining custom media channels within an IDPG according to a second embodiment of the present invention.

FIG. 5 illustrates a system 10' for creating and maintaining custom media channels according to a second embodiment of the present invention. The system 10' is substantially the same as the system 10 of FIG. 1. However, in this embodiment, the search engine 30 is implemented within the set-top box function 20.

Figure 6:
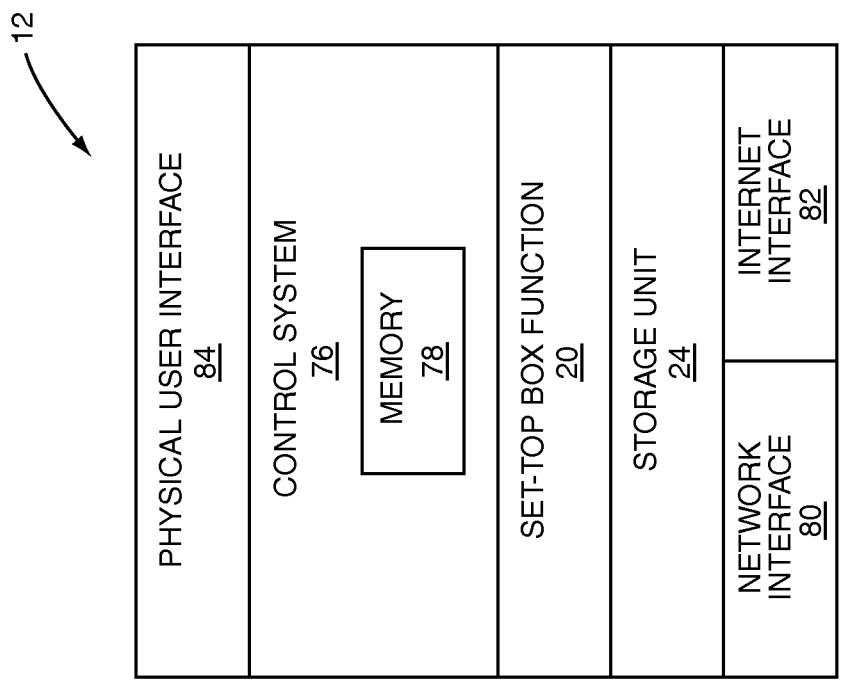
FIG. 6 is a block diagram of an exemplary media device incorporating the set-top box function according to one embodiment of the present invention.

FIG. 6 is a block diagram of the media device 12 according to one embodiment of the present invention. In general, the media device 12 includes a control system 76 having associated memory 78. The media device 12 also includes the set-top box function 20. Although the set-top box function 20 is illustrated separately from the control system 76, the set-top box function 20 may alternatively be implemented as one or more software components, which may be stored in the memory 78. The media device 12 also includes the storage unit 24. Alternatively, the storage unit 24, or a portion thereof, may be implemented in the memory 78. In addition, the media device 12 includes a network interface 80 for receiving traditional television content from the provider 14 via the network 16 (FIG. 1), and a Internet interface 82 communicatively coupling the media device 12 to the Internet 34 (FIG. 1). Note that the interfaces 80 and 82 may be a single communication interface but are shown separately for clarity. This may be the case where the media device 12 is coupled to the Internet 34 via the network 16. The media device 12 also includes a physical user interface 84 which includes, for example, the receiver 26 (FIG. 1) for receiving control signals from the remote control unit 28 (FIG. 1).

Those skilled in the art will recognize improvements and modifications to the preferred embodiments of the present invention. All such improvements and modifications are considered within the scope of the concepts disclosed herein and the claims that follow.

What is claimed is:

1. A method for creating and maintaining a custom media channel on a device comprising:
   accessing user preferences for the custom media channel;
   periodically searching, automatically, on the Internet to identify a plurality of media presentations that satisfy the user preferences;
   downloading a first media presentation of the plurality of media presentations to the device based on a determination that the first media presentation comprises downloadable content;
   storing by the device the first media presentation;
   storing by the device an identifier of a location on the Internet of a second media presentation of the plurality of media presentations based on a determination that the second media presentation comprises streamable content;
   streaming the second media presentation; and
   continuously effecting sequential playback of the plurality of media presentations as the custom media channel, wherein the stored first media presentation and the streamed second media presentation are played back on the custom media channel.

2. The method of claim 1 wherein the plurality of media presentations comprises audio files.

3. The method of claim 1 wherein the user preferences include at least one keyword.

4. The method of claim 1 wherein the device maintains an Interactive Digital Program Guide (IDPG).

5. The method of claim 4 further comprising modifying the IDPG to include the custom media channel that identifies the plurality of media presentations.

6. The method of claim 5 further comprising displaying the IDPG on a display associated with the device, wherein the display includes the streamable content and the custom media channel that identifies the plurality of media presentations.

7. A device for creating and maintaining a custom media channel comprising:
   a communication interface configured to communicate with a network; and
   a control system coupled to the communication interface, and configured to:
   access user preferences for the custom media channel;
   periodically search, automatically, on the Internet to identify a plurality of media presentations that satisfy the user preferences;
   download a first media presentation of the plurality of media presentations to the device based on a determination that the first media presentation comprises downloadable content;
   store the first media presentation;
   store an identifier of a location on the Internet of a second media presentation of the plurality of media presentations based on a determination that the second media presentation comprises streamable content;
   stream the second media presentation; and
   continuously effect sequential playback of the plurality of media presentations as the custom media channel, wherein the stored first media presentation and the streamed second media presentation are played back on the custom media channel.

8. The device of claim 7 wherein the plurality of media presentations comprises audio files.

9. The device of claim 7 wherein the user preferences include at least one keyword.

10. The device of claim 7 wherein the device maintains an Interactive Digital Program Guide (IDPG).

11. The device of claim 10 wherein the control system is further configured to modify the IDPG to include the custom media channel that identifies the plurality of media presentations.

12. The device of claim 11 wherein the control system is further configured to display the IDPG on a display associated with the device, wherein the display includes the streamable content and the custom media channel that identifies the plurality of media presentations.

13. A non-transitory computer-readable medium comprising programming instructions which, when executed on a processor, implement steps comprising:
   accessing user preferences for a custom media channel;
   periodically searching, automatically, on the Internet to identify a plurality of media presentations that satisfy the user preferences;
   downloading a first media presentation of the plurality of media presentations to a device based on a determination that the first media presentation comprises downloadable content;
   storing by the device the first media presentation;
   storing by the device an identifier of a location on the Internet of a second media presentation of the plurality of media presentations based on a determination that the second media presentation comprises streamable content;
   streaming the second media presentation; and
   continuously effecting sequential playback of the plurality of media presentations as the custom media channel, wherein the stored first media presentation and the streamed second media presentation are played back on the custom media channel.

14. The non-transitory computer-readable medium of claim 13 wherein the plurality of media presentations comprises audio files.

15. The non-transitory computer-readable medium of claim 13 wherein the user preferences include at least one keyword.

16. The non-transitory computer-readable medium of claim 13 wherein the device maintains an Interactive Digital Program Guide (IDPG).

17. The non-transitory computer-readable medium of claim 16 wherein the steps further comprise modifying the IDPG to include the custom media channel that identifies the plurality of media presentations.

18. The non-transitory computer-readable medium of claim 17 wherein the steps further comprise displaying the IDPG on a display associated with the device, wherein the display includes the streamable content and the custom media channel that identifies the plurality of media presentations.

* * * * *